United States Patent [19]

Mohan et al.

[11] Patent Number: 6,154,817
[45] Date of Patent: *Nov. 28, 2000

[54] DEVICE AND METHOD FOR MANAGING STORAGE MEDIA

[75] Inventors: Deepak Mohan, Huntington; Christopher Alonzo, Babylon; Harry Gosden, Amity Harbor; Maoping Cao, Bayside; Dwayne Rambarran, South Ozone Park, all of N.Y.

[73] Assignee: Cheyenne Software International Sales Corp., Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/767,161

[22] Filed: Dec. 16, 1996

[51] Int. Cl.[7] ....................................... G06F 12/16
[52] U.S. Cl. .......................... 711/162; 711/165; 707/204
[58] Field of Search ..................... 711/161, 162, 711/111, 112, 165; 707/204

[56] References Cited

U.S. PATENT DOCUMENTS

| | | | |
|---|---|---|---|
| 3,715,727 | 2/1973 | Yu | 395/821 |
| 5,267,351 | 11/1993 | Reber et al. | 707/104 |
| 5,276,867 | 1/1994 | Kenley | 707/204 |
| 5,287,459 | 2/1994 | Gniewek | 369/34 |
| 5,317,728 | 5/1994 | Tevis et al. | 707/204 |
| 5,469,560 | 11/1995 | Beglin | 711/112 |
| 5,469,573 | 11/1995 | McGill, III | 395/712 |
| 5,475,834 | 12/1995 | Anglin et al. | 707/203 |
| 5,522,037 | 5/1996 | Kitagawa | 395/183.16 |
| 5,664,186 | 9/1997 | Bennett | 707/204 |
| 5,673,382 | 9/1997 | Cannon et al. | 395/182.04 |
| 5,734,894 | 3/1998 | Adamson | 707/200 |

OTHER PUBLICATIONS

"Ozone Backup (2.02)—Reference & User Manual", Chapter 3 (pp. 3–1 through 3–6), Chapter 9 (pp. 9–1 through 9–37) and two cover pages, Edition 4.2, Copyright 1990–1993 Ozone Systems Pty Ltd.

"UCC One User Manual", Section 1, pp. 1–1 through 1–9, author(s) unknown, May 1987.

"Chapter 3. Setting Options and Organizing Tape Pools", pp. 3.1–3.21, author(s) and date unknown.

Primary Examiner—Hiep T. Nguyen
Attorney, Agent, or Firm—Robert D. Schaffer; Clifford Chance Rogers & Wells LLP

[57] ABSTRACT

A device and method for managing storage media is disclosed herein. The storage media is initially associated with a first set or a second set in the device. The device comprises a managing device for executing selectable storage rules. The selectable storage rules are for determining a first storage media, initially in the first set, to which data is to be stored. The managing device is also for executing selectable usage rules, wherein the selectable usage rules are for determining a second storage media, initially in the second set, to be transferred from the second set to the first set. The device also has a storage device in communication with the managing device adapted for transferring data to the first storage media in accordance with said selectable usage rules, so that when data is to be stored to the first storage media, the managing device applies the selectable storage rules for determining the first storage media and applies the selectable usage rules for determining the second storage media to be transferred from the second set to the first set.

30 Claims, 11 Drawing Sheets

| 222 (MEDIA POOL RECORD) | |
|---|---|
| MEDIA-POOL-ID | 222A |
| MEDIA-POOL-NAME | 222B |
| MIN-SAVE-COPIES | 222C |
| BASE-SERIAL-NUMBER | 222D |
| NEXT-SERIAL-NUMBER | 222E |
| SERIAL-NUMBER-RANGE | 222F |
| SAVE-SET-RETENTION-PERIOD | 222G |

FIG. 2B

| 224 (MEDIA RECORD) | |
|---|---|
| MEDIA-ID | 224A |
| MEDIA-NAME | 224B |
| SEQUENCE-NUMBER | 224C |
| RANDOM-ID | 224D |
| MEDIA-SERIAL-NUMBER | 224E |
| LAST-WRITE-INFO | 224F |
| DESTROYED-DATE | 224G |
| MEDIA-POOL-ID | 224H |
| MEDIA-POOL-SET | 224I |
| MEDIA-LOCATION-STATUS | 224J |
| LOCATION-ID | 224K |
| FIRST-FORMAT-DATE | 224L |
| LAST-FORMAT-DATE | 224M |
| LAST-READ-DATE | 224N |
| RETIRE-DATE | 224O |
| MEDIA-STATUS | 224P |
| NUMBER-OF-PASSES | 224Q |

FIG. 2C

| 226 (LOCATION RECORD) ||
|---|---|
| LOCATION-ID | 226A |
| LOCATION-INFO | 226B |
| SENDER-INFO | 226C |

FIG. 2D

| 228 (JOB RECORD) ||
|---|---|
| JOB-ID | 228A |
| JOB-OWNER-NAME | 228B |
| JOB-START-DATE | 228C |
| JOB-TYPE | 228D |

FIG. 2E

| 230 (SESSION RECORD) ||
|---|---|
| SESSION-ID | 230A |
| JOB-ID | 230B |
| MEDIA-ID | 230C |
| SESSION-TYPE | 230D |
| SESSION-NUMBER | 230E |
| HOST-ID | 230F |
| PATH-ID | 230G |

FIG. 2F

| 232 (FILE RECORD) ||
|---|---|
| SESSION-ID | 232A |
| HOST-ID | 232B |
| PATH-ID | 232C |

FIG. 2G

PROCESS 500

DEVICE AND METHOD FOR MANAGING STORAGE MEDIA

BACKGROUND OF THE INVENTION

1. Field of the Invention

The present invention relates to the management of storage media used to store computer data, and more particularly, to a device and method for maximizing the efficiency and accuracy of the management of storage media containing backup data by the automated tracking and management of the storage media using media pools.

2. Description of the Prior Art

Today's computer data processing systems generally include a host processor having one or more central processing units. The host processor is supported by one or more memory facilities and input/output interfaces. The processing units execute instructions which specify the manipulation of data stored within the memory facilities.

The advent of high capacity memory facilities confined with the necessity for accurate and restorable data available for the host processor makes the cost and performance of computer memory backup critical to the operability of the computer. Backup or storage media management has traditionally been performed manually. The data manager decides when to migrate or backup data, and where and how such migrated and backed up files should be stored. Accordingly, the decisions involve not only what and how often to store data from the computer to the storage media but also how to manage the transfer of the data from the computer to the storage media. Such decisions also include how to organize the storage media most efficiently and accurately such that the backup data is available when a restoration is necessary. Such decisions are time consuming and transparent to the normal operations of the computer. Indeed, limitations in storage media management usually become apparent only after the discovery of a problem of reading memory from its primary source. At that point, resort to the backup system is required.

In recent years, computer software has been developed to automate storage management of such backup media using media rotation techniques. One known media rotation technique uses a weekly rotation. According to this technique, seven backup media are used, that is, each individual media is assigned one for each day of the week. On a given day (e.g, a Monday), the backup media for Monday is used. Thus, each backup media gets reused on its assigned day during successive weeks. This is a simple rotation technique; however, it has the disadvantage of not being able to save data for more than seven days.

Another known technique is "Grandfather-Father-Son" or GFS. The GFS technique is often not practical because it requires the user to keep many backup media, which may become unmanageable. Also, a GFS rotation is fixed so that users cannot set up their own rotation parameters.

The "Tower of Hanoi" is another known rotation technique which utilizes the backup media differently than GFS. However, this technique stores incremental and full backups on many different backup media. Thus, during a restore process, the user may be required to use several different backup media to restore the desired data. Under the Tower of Hanoi approach, it is difficult to manage the backup media.

Further, it is well known to combine two or more backup storage media, for example, tapes, together in what are referred to as media pools. However, the pools are usually manually labeled and managed according to a user's individual handling system. Such manual operations reduce the efficiency selecting backup media and increase a likelihood that a media containing currently needed backup data will be inadvertently overwritten.

In addition, previous storage management devices handle each media within a media pool as a single unit of storage rather than organizing and monitoring individual portions of the media which may be available for additional storage. This approach prevents efficient use of each portion of the media as well as efficient use of the media in its entirety. This results in the quantity of storage media being needlessly high which places more strain on the system and the persons managing the system.

In view of the foregoing considerations, there is a need for an improved system which automates the organization and handling of backup media, and in particular, tapes.

SUMMARY OF THE INVENTION

According to one aspect of the invention, a device and method for managing storage media is disclosed herein. The storage media is initially associated with a first set or a second set in the device. The device comprises a managing device for executing selectable storage rules. The selectable storage rules are for determining a first storage media, initially in the first set, to which data is to be stored. The managing device is also for executing selectable usage rules, wherein the selectable usage rules are for determining a second storage media, initially in the second set, to be transferred from the second set to the first set. The device also has a storage device in communication with the managing device adapted for transferring data to the first storage media in accordance with said selectable usage rules, so that when data is to be stored to the first storage media, the managing device applies the selectable storage rules for determining the first storage media and applies the selectable usage rules for determining the second storage media to be transferred from the second set to the first set.

The device and method of the present invention will be better understood by reference to the following detailed description of specific embodiments and the attached Figures which exemplify and illustrate those embodiments.

BRIEF DESCRIPTION OF THE DRAWINGS

Representative embodiments of the present invention will be described with reference to the following drawings, wherein:

FIG. 2B illustrates a record 222 in the media pool database.

FIG. 2C illustrates a record 224 in the media database.

FIG. 2D illustrates a record 226 in the location database.

FIG. 2E illustrates a record 228 in the job database.

FIG. 2F illustrates a record 230 in the session database.

FIG. 2G illustrates a record 232 in the file database.

DESCRIPTION OF PREFERRED EMBODIMENT

Reference is now made to the appended Figures for the purpose of describing, in detail, the preferred embodiments of the present invention. The Figures and accompanying detailed description are not intended to limit the scope of the claims appended hereto.

Figure 1:
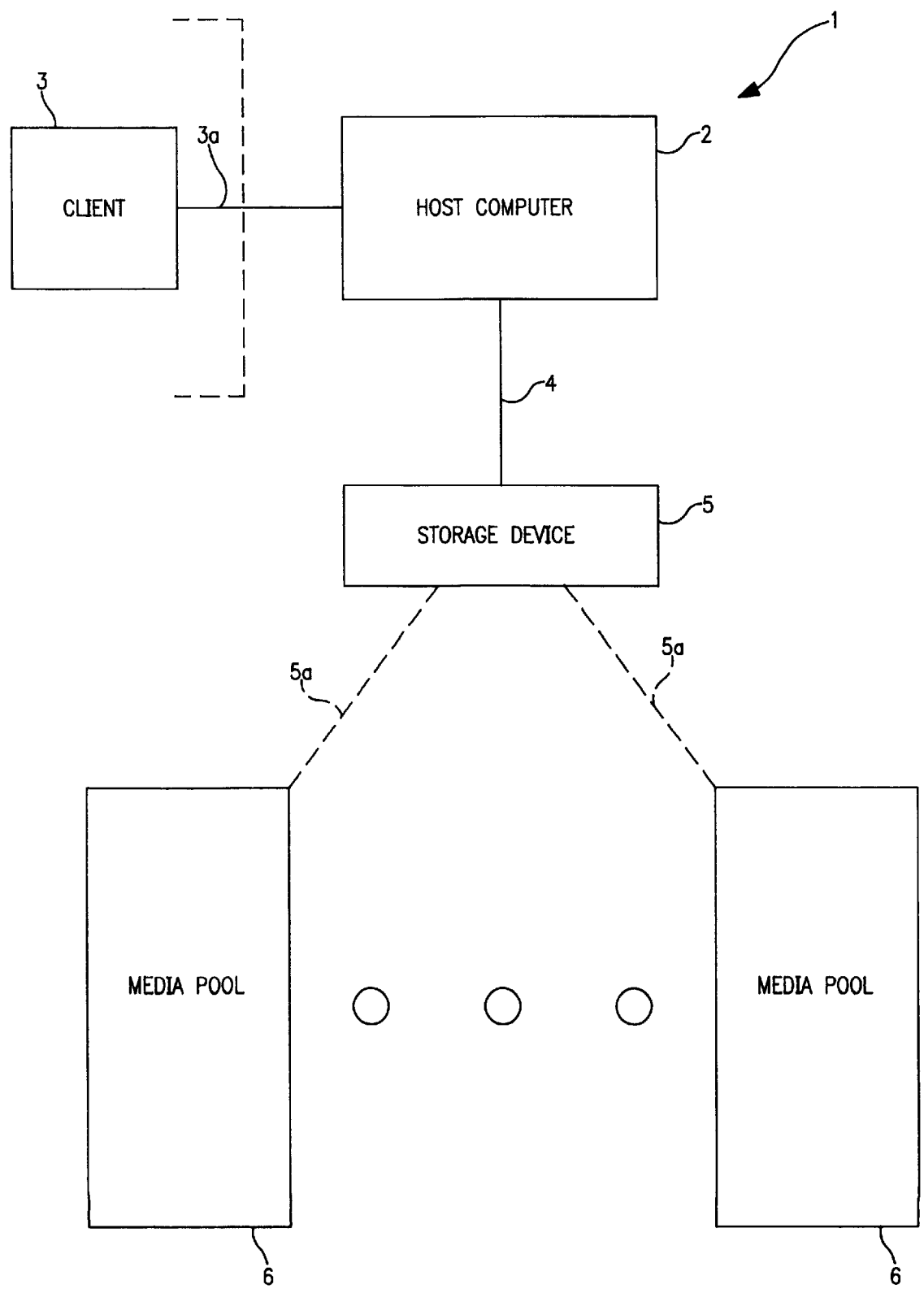
FIG. 1 generally depicts the preferred architecture of the present invention.

The preferred architecture of the present invention is generally depicted in FIG. 1. FIG. 1 shows a media management system 1 which includes a host computer 2, a storage device 5, and one or more media pools 6. The host computer 2 executes the processes which drive the present invention and is preferably a server on a local area network (LAN). Other servers and clients (PCs and/or workstations) may be connected to the host computer 2. The host computer 2 is preferably coupled to a client 3, over a connection 3a, which is well known in the art. The client computer 3 serves as a means for a user to input and provide data to the host computer 2. The storage device 5 is connected to the host computer 2 over a connection 4. The storage device 5 may be a tape drive, a tape autochanger having a tape drive, an optical drive, an optical jukebox having an optical drive, or the like. The connection 4 is well known in the art; therefore, it is not further described here.

The storage device 5 is connected to one or more media pools 6 over associations 5a. A media pool is a collection of media which are managed as a unit. The associations 5a associate, either logically or physically, the media pools 6 with the storage device 5. Each media pool 6 includes one or more backup media 6a which stores data from the host computer 2, the client 3, or other computer on the LAN. The media pools 6 can be a physical entity (e.g., a shelf) or some logical grouping of media. The backup media 6a are preferably tapes; but, they can also be other machine readable media such as an optical or magnetic disk, or the like.

Figure 2A:
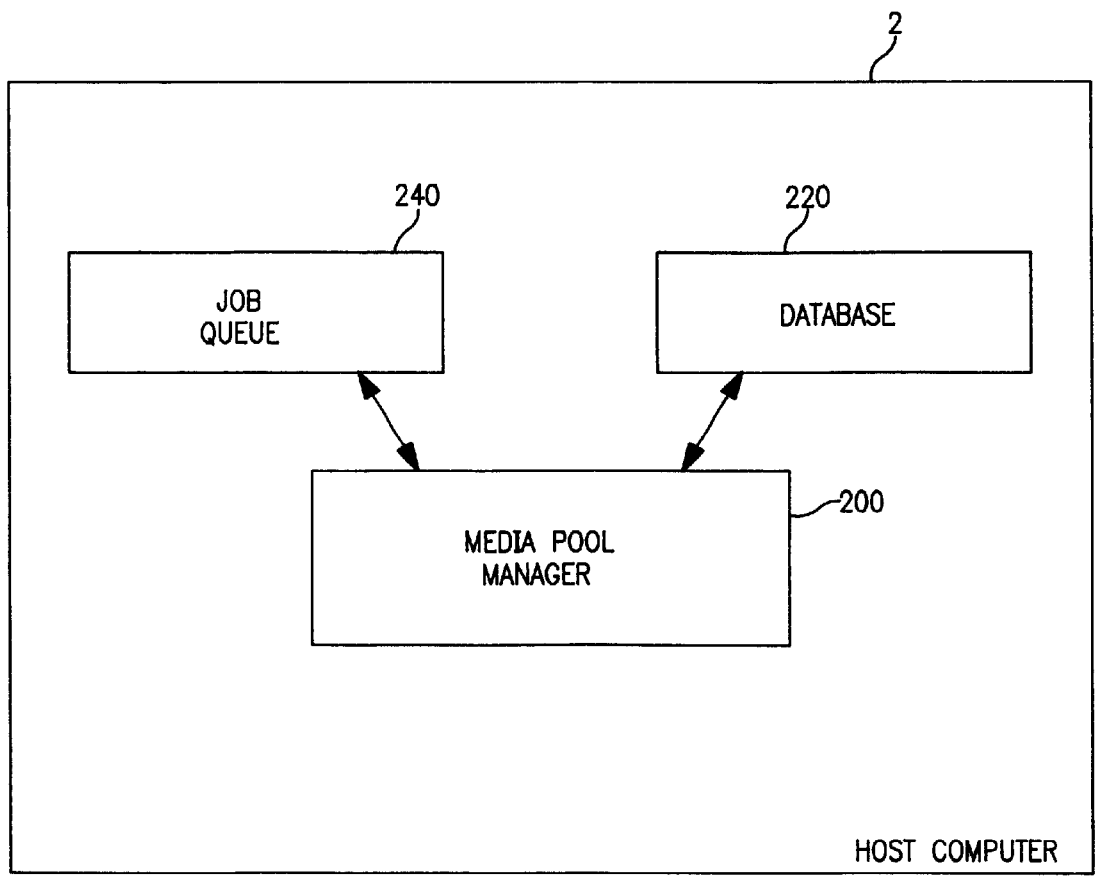
FIG. 2A depicts the host computer 2 in more detail.

FIG. 2A illustrates the host computer 2 in more detail. As shown there, the host computer 2 includes a media pool manager 200 which is adapted to write to and read from a database 220 and a job queue 240.

Figure 3:
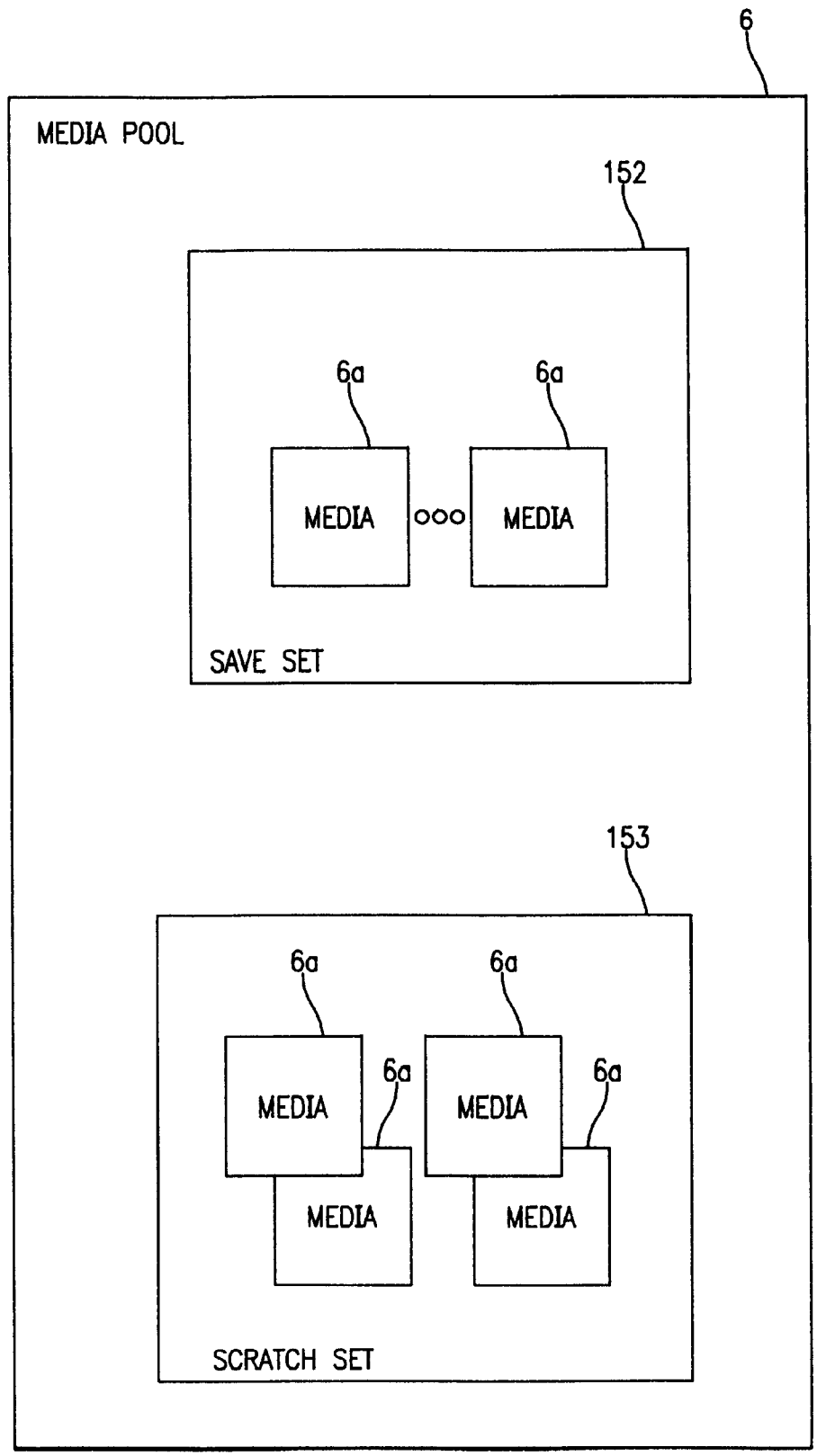
FIG. 3 depicts a media pool in more detail.

FIG. 3 depicts a media pool 6 in more detail. The media pool 6 includes a save set 152 and a scratch set 153. In a preferred embodiment, each media pool includes one save set 152 and one scratch set 153. Alternatively, a single scratch set 153 may be provided for common use by all of the media pools 6.

The save set 152 is a logical or physical collection of one or more media 6a in the media pool 6 which cannot be overwritten. The scratch set 153 is a logical or physical collection of one or more media 6a in the media pool 6. The media 6a in the scratch set 153 are recycled from the save set 152 which may be overwritten for the media pool 6 based on selectable usage rules. In the preferred embodiment, the selectable usage rules include the retention period and the minimum number of save set copies (fields 222G and 222C).

The database 220 in FIG. 2A includes a media pool database, a media database, a location database, a job database, a session database, and a file database. Each of these databases is now described in detail, appreciating that specific data structures and formats are not critical to and are not considered part of the present invention. Therefore, any modifications to the data structures and formats would be within the scope of the appended claims.

The media pool database includes data representing each of the media pools 6 in the media management system 1. As FIG. 2B illustrates, the media pool database includes one or more records 222, each having fields 222A–222G. A record 222 thus represents a particular media pool 6 which is part of the media management system 1.

The media-pool-id field 222A a identifies the particular media pool 6. The values for this field are generated, preferably in sequence, by the media pool manager 3.

The media-pool-name field 222B also identifies the particular media pool 6. The values for this field are preferably provided by the user via the client 3.

The min-save-copies field 222C represents the minimum number of media 6a included in the save set 152 of the particular media pool 6 before any of the media 6a can be recycled (moved) to the scratch set 153 of the media pool 6.

The particular media pool 6 has a serial number range and each media 6a included in the media pool 6 is assigned a serial number within the range. The base-serial-number field 222D represents the lowest (or starting) serial number for the media 6a in the media pool 6. The next-serial-number field 222E represents the next serial number which can be assigned to a media 6a in the media pool 6. The serial-number-range field 222F is the number of serial numbers for the media 6a in the media pool 6. The user of the media management system 1 may assign the values to the fields 222D, 222E and 222F relating to the base-serial-number, next-serial-number, and the serial-number-range. However, in a representative embodiment, the media management system 1 is adapted to use default values.

The save-set-retention-period 222G is a period of time (the retention period), preferably a number of days, that the media 6a in the particular media pools 6 has not been used before it will be moved from the save set 152 of the media pool 6 to the scratch set 153 of the media pool 6.

The media database includes data representing each of the media 6a included in the media pool 6 of the media management system 1. As FIG. 2C illustrates, the media database includes one or more records 224, each having fields 224A–224Q. A record 224 thus represents a particular individual media 6a that is in a media pool 6.

The media-id field 224A identifies the particular media 6a. The values for this field are generated, preferably in sequence, by the media pool manager 200.

The media-name field 224B also identifies the same particular media 6a. The value of the media-name field 224B is preferably assigned to the media 6a when the media 6a is formatted for the first time. The value for this field may be designated by the user as an alphanumerical or numerical string. For example, a media 6a may be named after one of the days of the week to indicate that the media 6a is to be used on that day. In addition, the media-name 224B may be modified each time the media 6a is overwritten. Sometimes, a backup job will cause data to span across two or more 6a. Thus, it is permitted that two or more media 6a may have the same media-name 224B.

In the case where a backup job causes data to span across two or more media, the sequence-number field 222C is used to identify a particular media 6a within the two or more media. For example, if three media 6a were required for a backup job, the three media would have the same media-name 224B. However, the first, second, and third media 6a would have a sequence-number 224C equal to "1", "2", and "3" respectively.

The random-id field 224D is a random value which is assigned to the particular media 6a. This tracks the sequence of media with the same media name that belong to the same backup job.

The media-serial-number field 224E is the serial number for the particular media 6a. It uniquely identifies the media 6a and is not overwritten at any time during the life of the media 6a. The media-serial-number 224E is preferably obtained by the media pool manager 200 from the next-serial-number field 222E of the media pool data record 222 representing the media pool 6 to which the media 6a belongs. In the alternative, the media-serial-number 224E may be assigned by the user, for example, from a bar code reader.

The last-write-info field 224F represents the last date and time when data was written to the particular media 6a.

The destroyed-date field 224G is the date when the information contained in the current record 224 is no longer valid. This occurs when, for example, the media 6a represented by the record 224 has been overwritten.

The media-pool-id field 224H identifies the particular media pool 6 to which the particular media 6a belongs. When the media 6a is in the save set 152 of a media pool 6, it preferably belongs to a single media pool 6. This field 224H also provides a link (relation) to the media-pool-id field 222A of record 222.

The media-pool-set field 222I indicates whether the particular media 6a is currently in the save set 152 or the scratch set 153 of its media pool 6.

The media-location-status field 224J indicates a status of the location of the particular media 6a in terms of its physical availability for use. In a preferred embodiment where the storage devices is a tape drive, the location-status field 224J has one of the following values: (1) "online" means the media 6a is physically positioned in the drive; (2) "offline" means that the media 6a is physically positioned outside of the drive; and (3) "offsite" means that the media 6a is physically positioned outside of the premises on which the storage device 5 is located.

The location-id field 224K identifies a physical location of the particular media 6a, if the field 224J indicates that the media is offsite.

The first-format-date 224L is the date that: the particular media 6a first became part of the media management system 1. The last-format-date 224M is the date when data on the particular media 6a was overwritten from the beginning of the media 6a. The last-read-date 224N is the date on which data was most recently read from the particular media 6a.

The retire-date field 2240 is the date that the particular media 6a is to be removed from the media management system 1. It is preferred that this date be set by default to one year after the first format-date 224L.

The media-status field 224P is a flag indicating a status for the particular media 6a. In a preferred embodiment, the status field 224P has one of the following values: (1) "save", indicating that the data contained on the media 6a should not overwritten; (2) "bad", indicating that the media 6a is not usable for either reading or writing (e.g., because it is destroyed or retired, as reflected by fields 224G and 224O, respectively; (3) "marginal", indicating that the media 6a is usable solely for reading (e.g, because it is worn out for writing); (4) "append only", indicating that the media 6a is usable solely for appending data and not for overwriting data which already exists on the media 6a; and (5) "permanent", indicating that the media 6a is not usable for writing because the data contained on it is to be maintained permanently.

The number-of-passes field 224Q indicates the number of times which data has been written to or read from the particular media 6a. This field may be divided into two separate fields, one of which tracks the number of times which data has been read from the media 6a, the other of which tracks the number of writes to the media 6a.

The location database includes data representing a set of possible physical locations at which media 6a can be stored. Referring to FIG. 2D, the location database includes one or more records 226, each of which have fields 222A–222C. A record 226 thus represents a location at which media 6a may be stored.

The location-id field 226A identifies a particular location at which the media 6a may be stored. The values for this field are generated, preferably in sequence, by the media pool manager 200. This field provides a link (relation) to the location-id field 224K of a media record 224 thus providing the location of the media 6a. The location-info field 226B indicates a name, address, telephone number, contact name, account number of the particular location at which the media 6a may be stored.

The senders-info field 226C indicates the name, company, address, telephone number, and contact person, of the entity maintaining their media 6a at the location. The fields 226B and 22C may be divided into more specific fields, if desirable.

The job database includes data representing jobs to be performed by the management system 1. Referring to FIG. 2E, the job database includes one or more records 228, each having fields 228A–228D. A record 228 thus represents a particular job to be performed by the media management system 1.

The job-id field 228A identifies a particular job. The values for this field are generated, preferably in sequence, by the media manger 200. The job-owner-name field 228B indicates the user who submitted the job. The job-start-date field 228C indicates the date on which the user requested that the job be run. The job-type field 228E indicates the type of job submitted. In the preferred embodiment, these are backup and restore jobs.

Each job has one or more sessions associated with it. A session is a source from which data is backed up. For each server backed up, a session relates to a volume on the server from which the data was backed up. For each client backed up, a session relates to a hard drive on the client from which the data was backed up. The session database includes data relating to sessions. Referring to FIG. 2F, it includes one or more records 230, each having fields 230A–230E. A record 230 thus represents a session.

The session-id field 230A identifies a particular session. The values for this field are generated, preferably in sequence, by the media pool manager 200. The job-id field 230B indicates the particular job to which the session belongs. This field 230B provides a link (relation) to the job-id field 228A of job database record 228.

The media-id field 230C indicates the particular media 6a to which data was backed up to for the session. The session-type field 230D indicates the operating or file system from which data was backed up for the session (e.g., Netware 4, Windows 95). The session-number field 230E indicates a physical portion on the media 6a to which data was backed up, if the media 6a is a tape. The host-id field 230F indicates the source of the data which was backed up during the session.

The file database includes information relating to each file which was backed up. Each file which was backed up is associated with a session which, in turn, is associated with a job. Referring to FIG. 2G, the file database includes one or more records 232, each having fields 232A–232E. A record 232 thus represents a file which was backed up.

The session-id field 232A indicates the session to which the file belongs. This field provides a link (relation) to the session-id field 230A of a record 230. The host-id field 232B indicates the source from which the file was backed-up. The path-id field 232C indicates the path of the file for the session.

Figure 4:
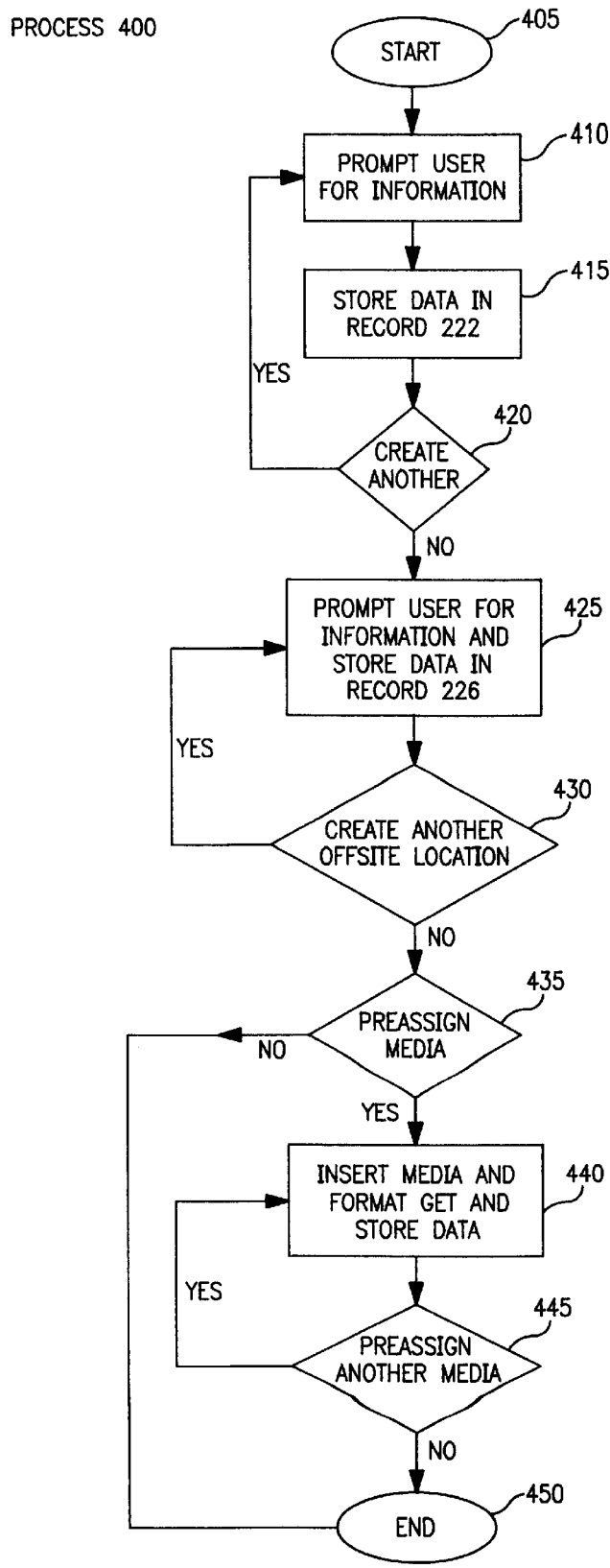
FIG. 4 is a flow chart illustrating process 400 for setting up the media management system 1.

FIG. 4 is a flow chart illustrating process 400 for setting up the media management system 1. The process 400 starts at step 405. At step 410, the media pool manager 200 creates a particular media pool 6 by prompting the user for the media pool name, the base serial number, and the serial number range for the media pool 6 being created.

At step 415, the media pool manager 200 creates a new record 222 which represents the media pool 6 being created. The value for the media-pool-id field 222A is determined by the media pool manager 200, as described above. The name, base serial number, and serial number range entered by the user at step 410 are written to the media-pool-name field 222B, the base-serial-number field 222D, and the serial-number range 222F field. The value for the next-serial-number field 222E is also initialized to a starting value.

The user is also prompted to enter selectable usage rules. In the preferred embodiment, the user enters the minimum number of save set copies and the retention period for the save set of the media pool 6 being created. These values are stored in the min-save-copies field 222C, the save-set-retention-period field 222G, respectively. Alternatively, the selectable usage rules may be obtained from default values.

At step 420, the media pool manager 200 presents the user with the option of creating another media pool 6. If the user selects yes, then processing returns to step 410.

If the user selects no at step 420, then the media pool manager 200 creates a location data record 226 at step 425. This location data record 226 represents a physical location at which media 6 may be stored. The value for the location-id field 226A is obtained from the media pool manager 200, as described above. The user is prompted to enter a name, address, telephone number, contact name, and the account number of a particular location at which media 6a may be stored. This inputted information is stored in the location-info field 226B of the record 226. The user is also prompted to enter his or her name, company, company address, company telephone number, and company contact name which are stored in the sender-info field 226C.

At step 430, the media pool manager 200 presents the user with an option of whether to create another location at which media 6a may be stored. If the user selects yes, then processing returns to step 425.

If the user selects no, then, at step 435, the media pool manager 200 asks the user whether he or she desires to a preassign media 6a to one of the media pools 6. If the user selects no at step 435, then the process 400 ends at step 450.

If the user selects yes at step 435, then the media pool manager 200 proceeds to step 440. There, the user causes a media 6a to be inserted into the drive the storage device 5 and the media 6a is formatted. The user is prompted to enter the name of the media pool 6 to which the newly formatted media 6a will belong. Alternatively, a default name may be used. A new media record 224 is created which represents the newly formed media 6a. The media pool record 222 matching to the name of the pool entered by the user is accessed. The value of the media-pool-id 222A is written to the media-pool-id field 224H. The value for the media-serial-number field 224E is assigned to the newly formatted media 6a using the value of the next-serial-number field 222E. Alternatively, a bar code reader can be used by the user to assign the next serial number to the media 6a. The value of the serial number is also written to the header of the newly formatted media 6a.

The media-id field 224A is updated as described above. The media-pool-name field 224B is set to a default value, preferably a concatenation of the values of the medial-pool-name field 222B and the media-serial-number field 224E. The sequence-number field 224C is initialized to the value "1". The random-id field 224D is generated as described above. The last-write-info, first-format-date, and last-format-date fields 224F, 224L, and 224M are set to the current date. The destroyed-date field 224G is set to zero. The media-pool-set field 224I is set to indicate the scratch set 153 and the media-location-status field 224J is set to "online". The location-id field 224K is initialized to blank. The last-read-date field 224N is set to "nil". The retire-date field 224N is set to one year from the current date. The media-status field 224P and the number-of-passes field 224Q are initialized to zero.

At step 445, the user is presented with a processing option by the media pool manager 200 of whether to preassign another media 6a. If the user selects yes, then processing returns to step 440. If the user selects no at step 445, then the process 400 ends at step 450.

Figure 5:
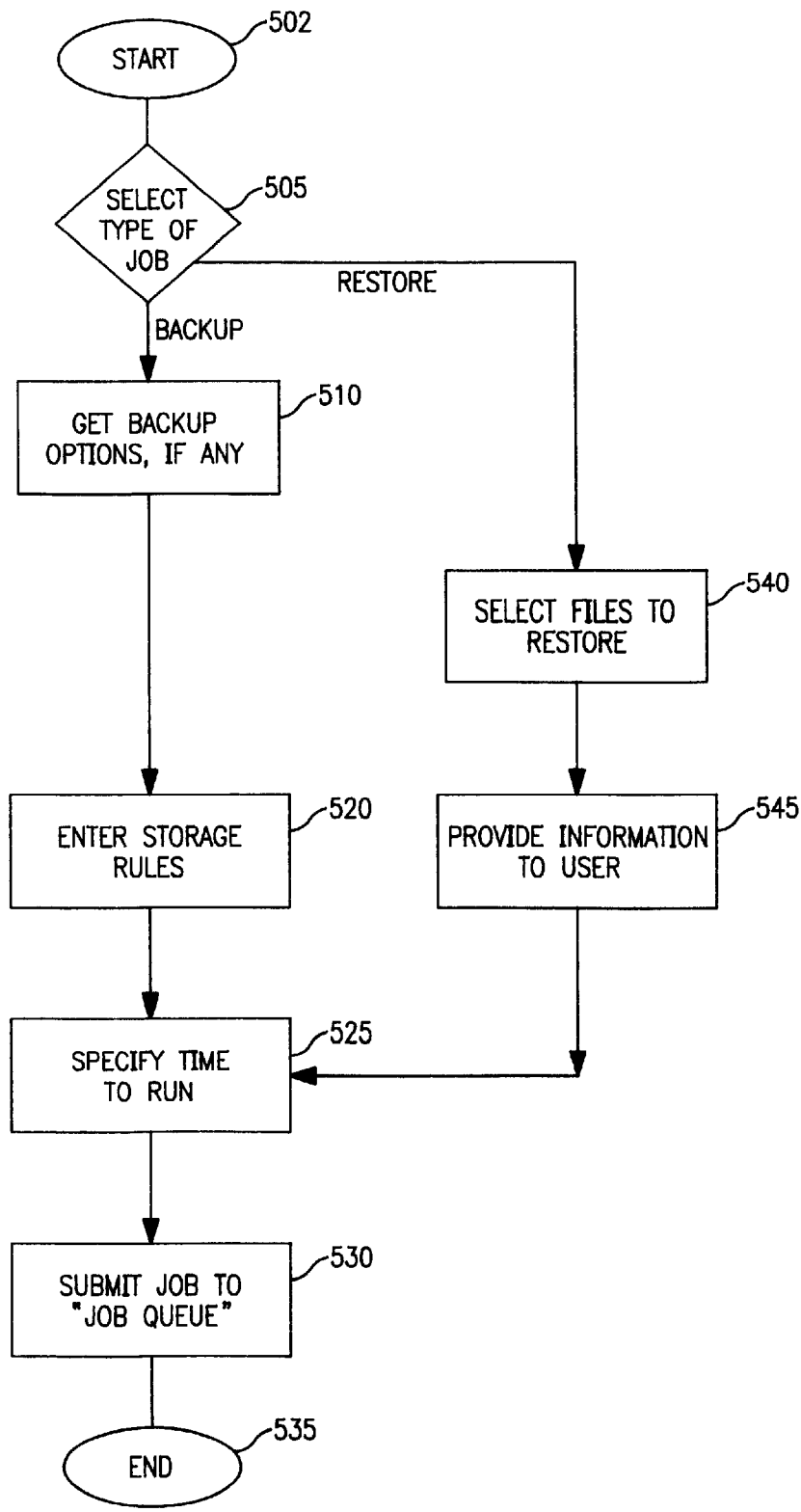
FIG. 5 is a flow chart illustrating process 500 for placing jobs in the job queue 240.

FIG. 5 is a flow chart illustrating process 500 which is used to place jobs in the job queue 240. The process 500 starts at step 502. At step 505, the user is asked to select the type of job to be performed. In the preferred embodiment, the selected job is a backup job or a restore job. If the user selects the backup job, then, at step 510, the user is preferably presented with the choice of selecting options for the backup job. The options are dependent on the functionality of the backup software and may include the sources to backup (e.g., servers, clients, and particular volumes and hard drives on those entities), job priorities, security passwords, and filters.

At step 520, the user is prompted to enter selectable storage rules which will be used to determine to which media 6a data will be backed up for the selected job. In the preferred embodiment, the selectable storage rules include the name of the media pool 6 to which data will be backed up. The selectable storage rules may include a name of a media 6a in the pool 6 to which data will be backed up, a wildcard (e.g., "*") to indicate that the user does not prefer that the data be backed up to a particular media 6a, and whether the determined media 6a for the backup will be overwritten or appended to.

At step 525, the user is asked to provide a date and time that the backup job will run. Flexibility may be provided by allowing the user to specify that a job can be run on multiple occasions (e.g, every Tuesday at midnight) and to specify certain days that the backup job will not be run (e.g., holidays).

At step 530, a new job data record 228 is created which corresponds the job being configured. The next job identification number is generated by the media pool manager 200, as described earlier, and is assigned to the job-id field 228A. The value for the job-owner-name field 228B is obtained from the system and is written to that field. The time for the job to run, as inputted by the user in step 525, is stored in the job-start-date field 228C. The value for the job-type field 228D is also set to indicate the type of job, here a backup job.

The backup job is placed in the job queue 240 which preferably is any array of pointers to records 228. The job queue 240 is configured to store jobs in the order that they are submitted. The subsequent execution of the jobs is done on a prioritized basis with the earliest scheduled job run first, as indicated by the job-start-date field 228C. The process 500 ends at step 535.

If the user selects a restore job at step 505, then processing proceeds to step 540. There, the user selects which files are to be restored. The files may be indicated directly (e.g., by entering the file name and path) or browsing the database records 224, 228, 230, and 232 according to well known techniques.

At step 545, the media pool manager 200 provides the media-pool-name 222A and the media-name 224B that is needed to restore the files selected at step 540 as follows. The record 232 corresponding to the file entered by the user is accessed. The session-id field 232A is accessed to determine the session during which the selected file was backed up. The media-id field 230C of the corresponding session record 230 is accessed, from which the corresponding media record 224 is accessed. From the media-name field 224B, the name of the media for the user to retrieve is obtained. The name of the media pool 6 is obtained from the media-pool-id field 224H, as it provides a link to a corresponding record 222 which includes the media-pool-name field 222B. Processing proceeds to step 525 where it continues as described above.

Figure 6:
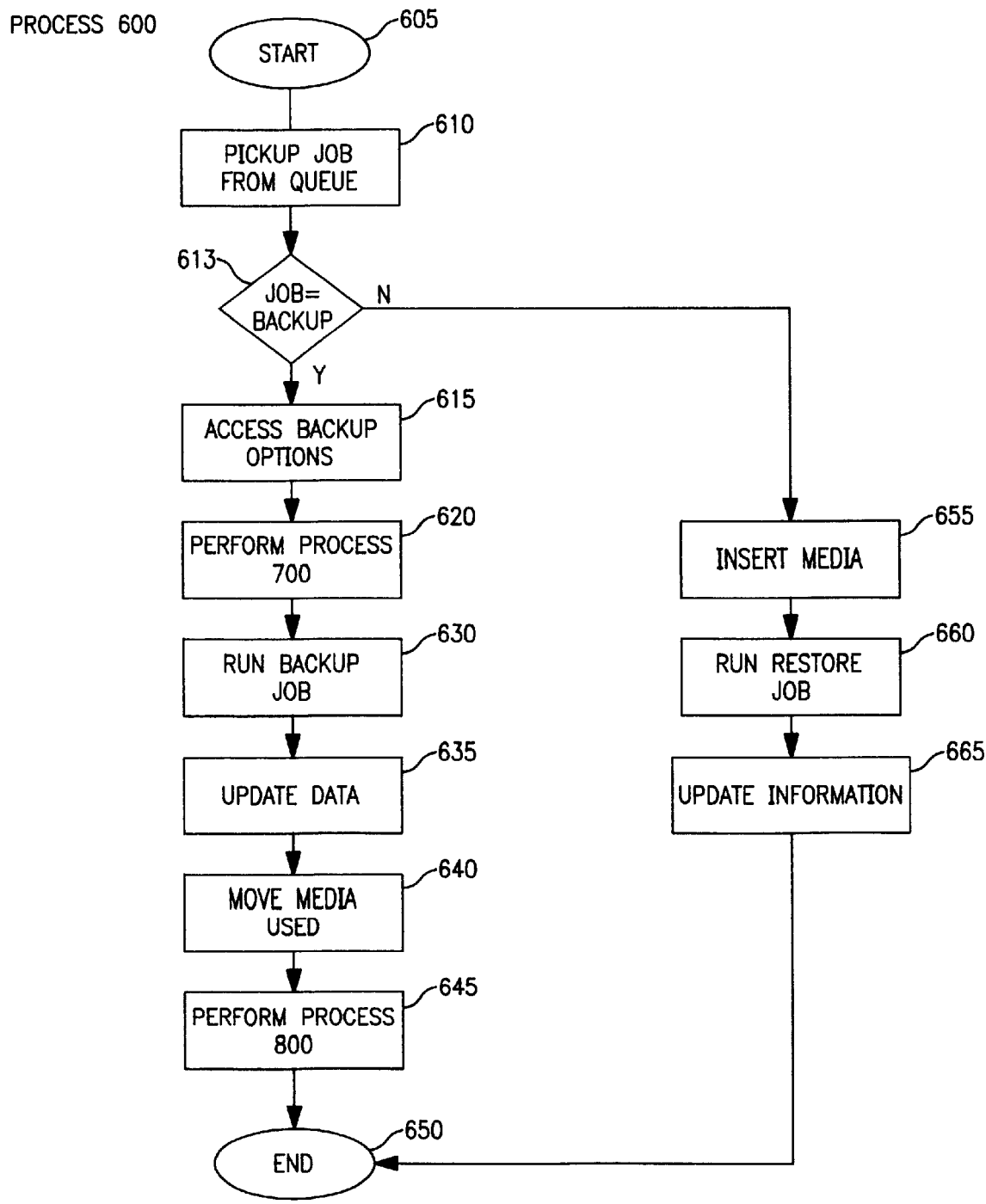
FIG. 6 is a flow chart illustrating process 600 for processing jobs in the job queue 240.

FIG. 6 is a flow chart illustrating process 600 for processing jobs in the job queue 240. The process 600 starts at step 605. At step 610, the media pool manager 200 accesses the job queue 240 which indicates a job record 228 for the next job to be run.

The value of the job-type field 228D, stored at step 530, in process 500 as shown in FIG. 5, is retrieved from the job data record 228. At step 613, if the value corresponds to a restore job, processing continues at step 655 where the media 6a determined at step 545 (FIG. 5) is placed in the drive of the storage device 5. At step 660, the media pool manager 200 causes the restore job to be executed.

At step 665, information relating to the media 6a from which data was restored in step 660 is updated as follows. The serial number written to the header of the media 6a is used to retrieve the corresponding media record 224 using the serial-number-field 224E. The last-read-date 224N is updated to the date that the restore job was run. The number-of-passes field 224Q is incremented. The process 600 is completed at step 650.

If the type of job is determined to be a backup job at step 613, processing continues at step 615 where the backup options inputted by the user at step 510 are accessed. The backup software configures the job accordingly. At step 620, a media 6a from scratch set 153 for the backup job, preferably from its media pool, is selected as follows.

Figure 7A:
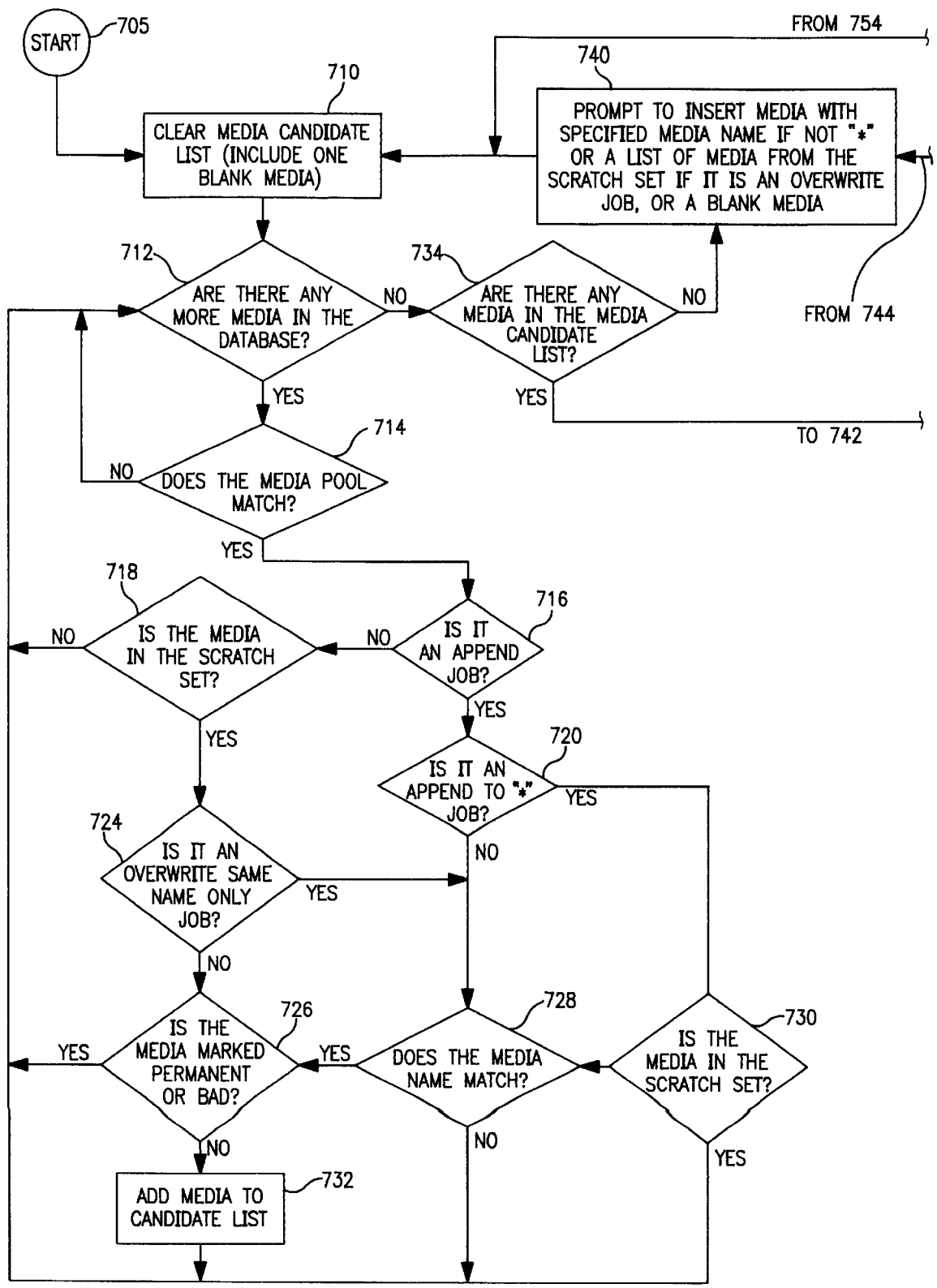
FIGS. 7A and 7B are flow charts illustrating process 700 for determining which media 6a in the save set 152 to use for a backup.

Referring to FIG. 7A, the process 700 for determining which media 6a in the scratch set 153 to use for the backup job starts at step 705. At step 710, a candidate list is created which will indicate records 224 of the potential media 6a ("candidates") to which data can be backed up. For the first iteration through the process 700, the candidate list is created empty and a blank media is added to it.

At step 712, the media data records 224 are examined to determine if any media 6a exist. If a media 6a does exist, the media-pool-id field 224H of the first media record 224 found to exist (the current media 6a) is accessed and processing continues at step 714. There, the value of the media-pool-id field 224H is used to access the corresponding media pool record 222. The media-pool-name 222B is compared against the media pool name designated by the user at step 520 for the backup job. If the values do not match, then processing returns to step 712 where the next media record 224 found to exist (the current media 6a) is accessed.

If the values do match, there is a media 6a in the target media pool 6 and processing continues to step 716. There, certain of the selectable storage rules are examined. If the selectable storage rules indicate that the backup job is an "append" job, as inputted at step 520 (FIG. 5), processing continues at step 720. There, it is determined if the user entered a wildcard as the target media name such that the data may be appended to any allowable media 6a in the save set 152 for the media pool 6.

If a wildcard was entered or the field is left blank, then, at step 730, it is determined whether the current media represented by the record 224 is in the scratch set 153, as reflected in the media-pool-set field 224I. Media 6a in the scratch set 153 preferably are not to be appended to. Therefore, if the current media represented by the record 224 is in the scratch set 153, it is not added to the candidate list and processing returns to step 712. If the current media represented by the record 224 is not in the scratch set 153, at step 730, or if a wildcard was not found at step 720, processing continues at step 728. There, the value of the media-name field 224B is compared to the name of the media specified by the user for the job at step 520. If the names do not match, processing continues at step 712.

If the names do match at step 728, processing continues at step 726 where the media-status flag 224P of the current media is examined. If that flag indicates that the current media represented by the record 224 is "permanent" or "bad", then processing continues at step 712. If the current media represented by the record 224 is not "permanent" or "bad", then the current media is added to the candidate list at step 732.

If the job is not an append job at step 716, processing proceeds to step 718. There, it is determined whether the current media represented by the record 224 is in the scratch set 153, as reflected by the value of the media-pool-set field 224I. If the current media represented by the record 224 is not in the scratch set 153, it is not added to the candidate list and processing returns to step 712.

If the media represented by the record 224 is determined to be in the scratch set 153 at step 718, processing continues to step 724. There, if the selectable storage rules indicate an "overwrite" job, as inputted at step 520, to a media 6a with the specified name (not a wildcard), processing proceeds to step 728, which is described above. If the job is not is an "overwrite" job to a media with the specified name, processing proceeds to step 726, which is described above.

At step 712, if there are no more media 6a, as represented by the records 224, processing proceeds to step 734 where it is determined whether there are media 6a in the candidate list. If there are no such media 6a in the candidate list, processing continues to step 740. There, if the media name specified for current backup job is not a wildcard, the user is prompted to insert the particular media 6a having the media name (specified at step 520) into the storage device 5 at step 740.

If the media name inputted at step 520 for current job is a wildcard, the user is presented with a list of media 6a from the scratch set 153 (or a blank media) from which to choose. After the chosen media is inserted into the drive of the storage device 5, processing proceeds to step 710.

Figure 7B:
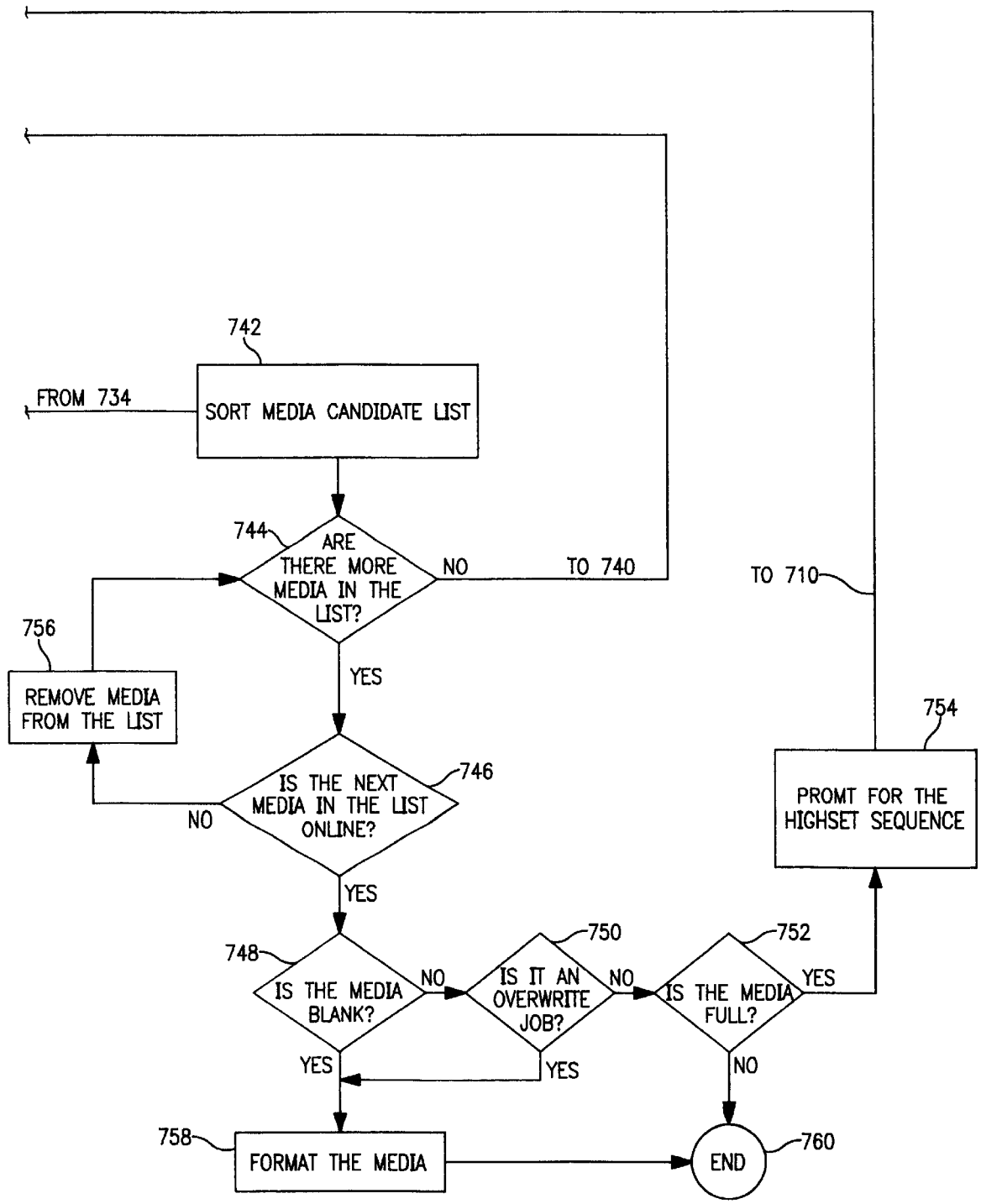

If there are media in the candidate list at step 734, processing continues at step 742 shown in FIG. 7B. There, the candidate list representing candidate media for backup are sorted. The media 6a from the candidate list in the save set 152 are placed in the sorted candidate list before media in the scratch set 153. The media 6a from the candidate list in the save set 152 are sorted first in descending order by the value of the last-write-info field 224F. The candidate media with the same values in the media-name field 224B and random-id field 224D are sorted in descending order by the value of the sequence-number 224E. The candidate media in the scratch set 153 are sorted in ascending order by the value of the last-format-date 224M.

Processing continues to step 744 where it is determined whether there are more candidate media in the candidate list. If there are not, processing continues at step 740 of FIG. 7A, as described above. If there are candidate media in the candidate list, at step 746 it is determined whether the status of the candidate media, as reflected by the value of the media-location-status field 224J, is "online". If it is not, processing continues at step 756 where the candidate media is removed from the candidate list. After step 756, processing returns to step 744. If the candidate media is determined to be "online" at step 746, the candidate media is checked to determine if it is "blank" at step 748. If the candidate media is blank, it is formatted at step 758 to be used for the backup job. The process 700 ends at step 760.

If the media 6a is not "blank" at step 748, it is determined at step 750 if the job as entered by the user is an "overwrite" job. If it is, processing continues at step 758 as described above. If it is not an overwrite job, processing proceeds to step 752 where it is determined if the media is full. If it is not full, the candidate media will be used for the backup job and the process 700 ends at step 760. If the candidate media is full at step 752, the user is prompted at step 754 to insert the candidate media with the highest sequence number for the media name. After the user inserts that media 6a, processing returns to step 710 which was described above.

Processing returns after step 760 to step 630 of FIG. 6. There, the backup job is run and session records 230 and file records 232 are created for each session and file, respectively. The session records 230 are updated as follows. The session-id field 230A is generated as described above. The value of the job-id field 230B is obtained from the current job record 228. The media-id field 230C is obtained from the media 6a which was determined for the backup job according to the process 700. The session-type field 230D is updated based on the source of the data being backed up as described above. The session-number field 230E is updated based on the position on the media to which the data was written, as described above. The host-id and path-id fields 230F and 230G are updated based on the source of the data and the path on the source of the data, respectively. The file records 232 are updated as follows. The values for the session-id field 232A, host-id field 232B, and path-id field 232C are obtained from the session-id field 230A, host-id field 230F, and path-id field 230G of the corresponding session record 230.

At step 635, information relating to the media 6a to which data was backed up in step 630 is updated as follows. The serial number of the media 6a is accessed from the header of the media 6a and the corresponding media record 224 is accessed. The media-name field 224A is updated from the users input at step 520 and the random-id and sequence-number fields 224D and 224C are updated by the media pool manager 200. The media-serial-number field 224E is assigned if the media 6a was blank. The first-format-date field 224L is updated if the media was blank. If the job was an "overwrite" job as inputted at step 520, then the last-format-date field 224M is updated to reflect the date of the backup job. The last-write-info field 224F is updated to reflect the last date and time when data was written to the media 6a. The media-location-status field 224J is updated to reflect that the media 6a is "online".

At step 640, the media pool manager 200 moves the media 6a which was used for the backup to the save set 152 by setting the media-pool-set field 224I accordingly.

Figure 8:
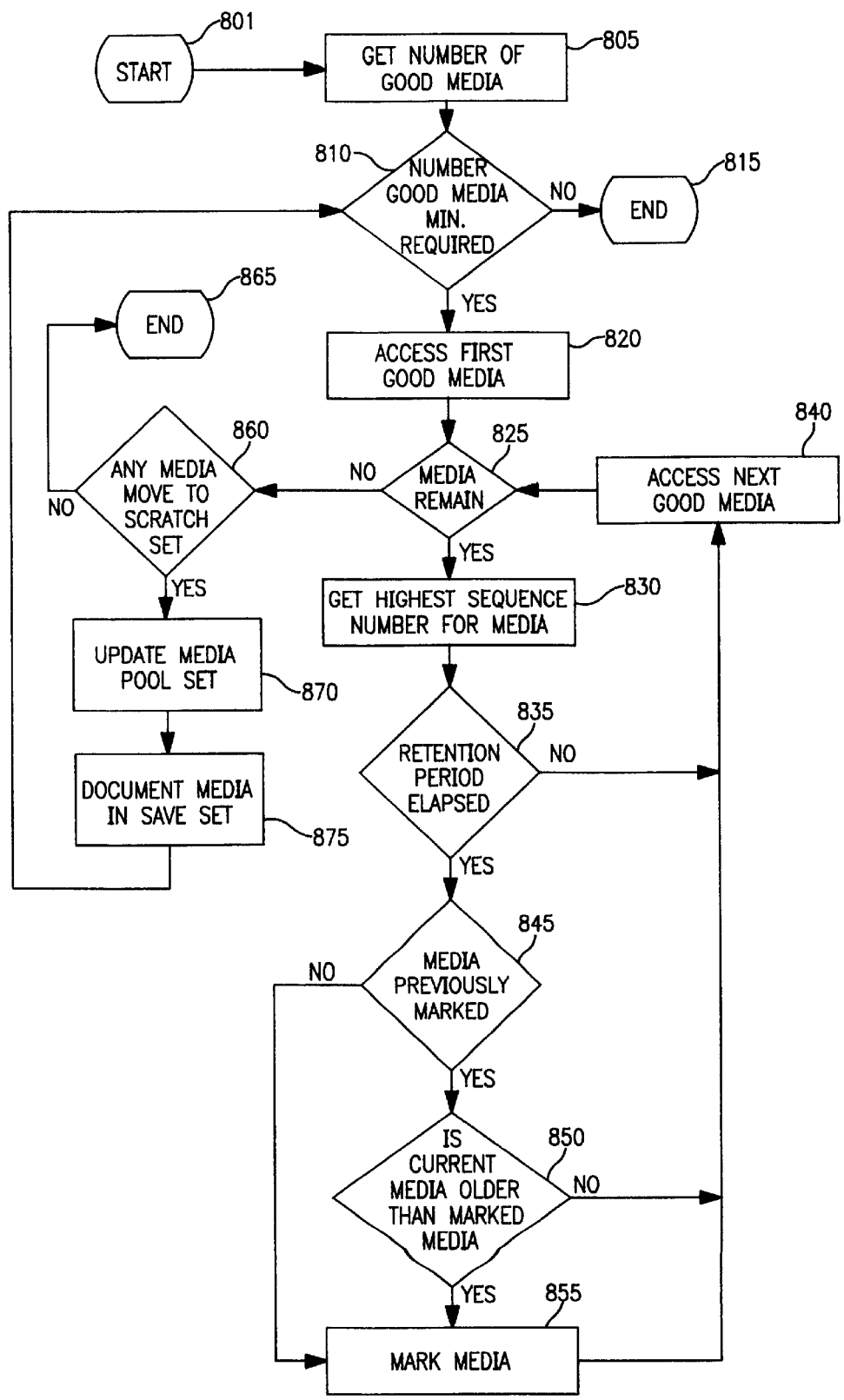
FIG. 8 is a flow chart illustrating process 800 for moving media 6a from a save set to a scratch set.

At step 645, it is determined whether media are to be moved from the save set 152 into the scratch set 153. This is done according to process 800 of FIG. 8 which starts at step 801.

At step 805, the media pool manager 200 obtains a count of the number of media 6a in the save set 152 which may be written to or read from. This is done by examining the media-status flag 224P for each media 6a having its media-pool-set field 224I indicating that the media 6a is in the save set 152. If the media-status flag 224P has a value other than "bad" (indicating that the media 6a is not usable for reading or writing), the count is incremented.

At step 810, the media pool manager 200 determines whether the number of good media determined at step 805 is greater than the minimum number required to be maintained in the save set 152. This is done by comparing the number of good media determined at step 805 to the value of the value of the minimum-save-set-copies field 222C for the pool 6 to which the media 6a belongs. If the number of good media is not greater, then the media pool manager 200 ends processing at step 815.

If the number of good media is determined to be greater at step 810, then, at step 820, the media pool manager 200 accesses the first (here, current) media in the save set 152 which has a value in the media-status field 224P other than "bad" (indicating that the media 6a is not usable for reading or writing). The media pool manager 200 proceeds to step 825. There, it is determined whether any other media 6a remain in the save set 152, aside from the current media accessed at step 820.

If it is determined at step 825 that other media remain, processing proceeds to step 830 where the media pool manager 200 identifies any other media with the same media-name 224B as the current media. The highest value for the sequence-number field 224C for the current media with the same media name is determined.

At step 835, the media pool manager 200 determines whether the retention period has elapsed. This is done by calculating the amount of time between the current date and the date indicated by the last-write-info field 224F for the current media. If the amount of time calculated does not exceed the value for the save-set-retention-period field 222G, then the retention period has not elapsed, and processing proceeds to step 840. There, the next media 6a (now, the current media) in the save set 152 which has a value in the media-status field 224P other than "bad" (indicating that the media 6a is not usable for reading or writing) is accessed. Processing returns to step 825, as described above.

If the amount of time calculated does exceeds the value for the save-set-retention-period field 222G, then the retention period has elapsed, and processing proceeds to step 845. There, the media pool manager 200 determines whether any media 6a have been previously marked to be moved to the scratch set 153 of the pool 6. For the first iteration, no such media 6a has been marked and processing continues at step 855, described below. If there are media 6a which have been marked, then, at step 850, the media pool manager 200 determines whether the current media is older than the media 6a which has been marked. This is done by comparing the values of the last-write-info field 224F for both media. If the current media is older than the media which was marked, then the current media is marked to be moved to the scratch set 153 at step 855. Processing proceeds to step 840, as described above.

If it is determined at step 825 that no media remain, processing proceeds to step 860 where the media pool manager 200 determines whether any media 6a have been moved to the scratch set 153. If media 6a have not been moved to the scratch set 153, then processing ends at step 865. If it is determined at step 860 that media 6a have been moved to the scratch set 153, then processing continues at step 870 where the media pool manager 200 updates the media-pool-set field 224I for all media having the same media-name 224B as the marked media to indicate the media 6a are in the scratch set 153. Processing proceeds to step 875 where a counter indicting the number of media in the save set 152 is decremented. Processing continues at step 810 where another iteration of process 800 is performed. When the process 800 ends at either of steps 815 or 865, processing returns to step 650 of FIG. 6 where process 600 ends.

Although the particular embodiments shown and described above will prove to be useful in many applications relating to the arts to which the present invention pertains, further modifications of the present invention herein disclosed will occur to persons skilled in the art. All such modifications are deemed to be within the scope and spirit of the present invention as defined by the appended claims.

We claim:

1. A system for storing data on storage media organized in media pools, the system comprising:
    a plurality of media pools, each media pool being associated with a job and having at least a first set of storage media and a second set of storage media;
    a media manager that determines which media pool is to be used for a particular job, and that determines a storage medium in the determined media pool to which data associated with the job is to be stored, and cycles the storage media in the media pool between the first set and the second set so that the data associated with the job can be stored on the storage medium cycled from the second set to the first set; and
    a storage device in communication with the media manager and adapted for transferring the data associated with the job to the storage medium cycled from the second set to the first set.

2. The system according to claim 1, wherein the media manager uses selectable storage rules to determine which media pool to use for the particular job.

3. The system according to claim 1, wherein the media manager uses selectable storage rules to determine which storage medium in the determined media pool to store the data associated with the job.

4. The system according to claim 1, wherein media manager cycles storage media between the first and second sets in response at least in part to selectable usage rules.

5. The system according to claim 1, wherein the size of the first set is not equal to the size of the second set.

6. The system according to claim 1, wherein the first set in each media pool is a save set in which at least a portion of the storage media in the first set are not overwritten, and wherein the second set in each media pool is a scratch set in which storage media that satisfy selectable usage rules can be cycled to the save set and overwritten.

7. The system according to claim 1, wherein the each media pool is a unitary pool that includes the first and second sets.

8. The system according to claim 1, wherein the each media pool comprises a first set and an independent second set.

9. A media management system comprising:
    a plurality of media pools, each media pool being associated with a particular job to be performed by the media management system, and each media pool having a first set of storage media and a second set of storage media
    a computer having a media manager, wherein the media manager determines which media pool is to be used for the particular job and determines at least one storage medium in the media pool to which data associated with the particular job is to be stored, and wherein the media manager causes the cycling of the storage media between the first set and the second set in response at least in part to media usage rules; and
    a storage device in communication with the computer and adapted for transferring data associated with the job between the storage medium on which the data is stored and the computer in response to the particular job.

10. The system according to claim 9, wherein the job is a restore job.

11. The system according to claim 9, wherein the job is a backup job.

12. The system according to claim 9, wherein the media manager uses media storage rules to determine which media pool to use for the particular job.

13. The system according to claim 9, wherein the media manager uses media storage rules to determine which storage media in the determined media pool to store the data associated with the job.

14. The system according to claim 9, wherein media manager cycles storage media between the first and second sets in response at least in part to media usage rules.

15. The system according to claim 9, wherein the first set in each media pool is a save set in which at least a portion of the storage media in the first set are not overwritten, and wherein the second set in each media pool is a scratch set in which storage media that satisfy media usage rules can be cycled to the save set and overwritten.

16. The system according to claim 9, wherein the each media pool is a unitary pool that includes the first and second sets.

17. The system according to claim 9, wherein the each media pool comprises a first set and an independent second set.

18. A media management system comprising:
    a media pool associated with a particular job to be performed by the media management system, the media pool having a first set of storage media and a second set of storage media;
    a computer having a media manager, wherein the media manager determines a storage medium in the media pool to which data associated with the particular job is to be stored, and wherein the media manager causes the cycling of the storage media between the first set and the second set in response at least in part to media usage rules; and
    a storage device in communication with the computer and adapted for transferring data associated with the job between at least one storage medium in the media pool and the computer in response to the particular job.

19. The system according to claim 18, wherein the particular job is a restore job.

20. The system according to claim 18, wherein the particular job is a backup job.

21. The system according to claim 18, wherein the media manager determines the storage medium in the determined media pool to store the data associated with the job in response to media storage rules.

22. The system according to claim 18, wherein media manager cycles storage media between the first and second sets in response at least in part to media usage rules.

23. The system according to claim 18, wherein the first set in the media pool is a save set in which at least a portion of the storage media in the first set are not overwritten, and wherein the second set in the media pool is a scratch set in which storage media that satisfy media usage rules can be cycled to the save set and overwritten.

24. The system according to claim 18, wherein the media pool is a unitary pool that includes the first and second sets.

25. The system according to claim 18, wherein the media pool comprises a first set and an independent second set.

26. A media management system comprising:
- a media pool associated with a particular job to be performed by the media management system and having a first set of storage media and a second set of storage media;
- managing means for determining at least one storage medium in the media pool to which data associated with the particular job is to be stored and for causing the cycling of the storage media between the first set and the second set in response at least in part to media usage rules; and
- storage means in communication with the managing means for transferring data associated with the particular job to the at least one storage medium in the media pool after the at least one storage medium is cycled from the second set to the first set.

27. The system according to claim 26, wherein the managing means uses media storage rules to determine the at least one storage medium in the determined media pool to store the data associated with the job.

28. The system according to claim 26, wherein managing means causes the cycling of storage media between the first and second sets in response at least in part to media usage rules.

29. The system according to claim 26, wherein the first set in the media pool is a save set in which at least a portion of the storage media in the first set are not overwritten, and wherein the second set in the media pool is a scratch set in which storage media that satisfy media usage rules can be cycled to the save set and overwritten.

30. A method for managing storage media in media pools, each media pool having a first set of storage media and a second set of storage media, the method comprising:
- queuing one or more jobs;
- determining the media pool associated with a job in the queue;
- determining at least one storage medium in the determined media pool to store data associated with the job;
- cycling storage media between the first set and the second set such that when the at least one storage medium to which the data associated with the job is to be stored is in the second set, the at least one storage medium is cycled to the first set; and
- transferring data to the at least one storage medium cycled to the first set.

* * * * *